(12) United States Patent
Po

(10) Patent No.: US 6,950,586 B2
(45) Date of Patent: Sep. 27, 2005

(54) FIBER FOR ENHANCED ENERGY ABSORPTION

(75) Inventor: Hong Po, Sherborn, MA (US)

(73) Assignee: OCG Technology Licensing, LLC, Columbia, MD (US)

( * ) Notice: Subject to any disclaimer, the term of this patent is extended or adjusted under 35 U.S.C. 154(b) by 0 days.

(21) Appl. No.: 10/653,435

(22) Filed: Sep. 2, 2003

(65) Prior Publication Data

US 2004/0156606 A1 Aug. 12, 2004

Related U.S. Application Data

(63) Continuation of application No. PCT/US02/06190, filed on Mar. 1, 2002, and a continuation-in-part of application No. 09/798,148, filed on Mar. 2, 2001, now Pat. No. 6,516,124.

(51) Int. Cl.⁷ .............................. G02B 6/02; H01S 3/30
(52) U.S. Cl. ..................... 385/127; 385/126; 385/123; 385/146; 359/341.1; 359/341.3; 372/6
(58) Field of Search .................................. 385/123, 124, 385/126, 127, 128, 141, 146, 147, 125; 372/6; 359/341.1, 341.3

(56) References Cited

U.S. PATENT DOCUMENTS

| 3,395,331 A | 7/1968 | Snitzer ........................ 372/6 X |
| 3,590,248 A | 6/1971 | Chatterton, Jr. ............ 372/6 X |
| 3,729,690 A | 4/1973 | Snitzer ........................ 372/6 X |
| 3,808,549 A | 4/1974 | Maurer .................... 385/123 X |
| 4,173,393 A | 11/1979 | Maurer .................... 385/123 X |
| 4,315,666 A | 2/1982 | Hicks, Jr. .................. 385/42 X |
| 4,701,614 A | 10/1987 | Jaeger et al. ........... 250/227.11 |
| 4,815,079 A | 3/1989 | Snitzer et al. ................. 372/6 |
| 4,829,529 A | 5/1989 | Kafka ............................ 372/6 |
| 5,077,087 A | 12/1991 | Byer et al. .................. 427/163 |
| 5,121,460 A | 6/1992 | Tumminelli et al. ........ 385/126 |
| 5,155,621 A | 10/1992 | Takeda et al. .............. 359/337 |
| 5,291,501 A | 3/1994 | Hanna ............................ 372/6 |
| 5,317,667 A | 5/1994 | Weber et al. ............... 385/147 |
| 5,319,652 A | 6/1994 | Moeller et al. ............. 385/123 |
| 5,349,590 A | 9/1994 | Amirkhanian et al. ......... 372/6 |
| 5,371,815 A | 12/1994 | Poole ........................... 385/28 |
| 5,373,576 A | 12/1994 | Minns et al. ............... 385/125 |
| 5,402,966 A | 4/1995 | von Hoessle .............. 244/3.12 |
| 5,418,880 A | 5/1995 | Lewis et al. ................ 385/123 |

(Continued)

FOREIGN PATENT DOCUMENTS

| EP | 0 903 876 B1 | 8/1998 | ............. 385/123 X |
| EP | 1043816 A2 | 10/2000 | ............. 385/123 X |
| WO | WO 93/15536 | 8/1993 | ............. 385/123 X |
| WO | WO 99/30391 | 6/1999 | ................. 385/123 |
| WO | WO 02/071554 A3 | 10/2003 | ............. 385/123 X |

OTHER PUBLICATIONS

Nilsson et al.; "Yb3+ –ring–doped fiber for high–energy pulse amplification"; Optics Letters, vol. 22, No. 14, pp. 1092–1094 (Jul. 15, 1997).

(Continued)

*Primary Examiner*—Brian M. Healy
(74) *Attorney, Agent, or Firm*—Peter I. Rainville; Sean P. Daley; Fish and Richardson P.C.

(57) ABSTRACT

Fibers, including fiber lasers and fiber amplifiers, and systems containing such fibers are disclosed.

23 Claims, 14 Drawing Sheets

U.S. PATENT DOCUMENTS

| | | | |
|---|---|---|---|
| RE35,020 E | 8/1995 | Quinlan, Jr. | 385/123 X |
| 5,530,710 A | 6/1996 | Grubb | 372/6 |
| 5,533,163 A | 7/1996 | Muendel | 385/126 |
| 5,675,690 A | 10/1997 | Nouchi et al. | 385/127 |
| 5,684,909 A | 11/1997 | Liu | 385/127 |
| 5,715,346 A | 2/1998 | Liu | 385/127 |
| 5,756,209 A | 5/1998 | Hale | 385/124 |
| 5,761,234 A | 6/1998 | Craig et al. | 372/75 |
| 5,781,684 A | 7/1998 | Liu | 385/124 |
| 5,822,489 A | 10/1998 | Hale | 385/145 |
| 5,832,163 A * | 11/1998 | Hollister | 385/123 |
| 5,835,655 A | 11/1998 | Liu et al. | 385/43 |
| 5,864,644 A | 1/1999 | DiGiovanni et al. | 385/43 |
| 5,864,645 A | 1/1999 | Zellmer et al. | 385/126 |
| 5,873,923 A | 2/1999 | DiGiovanni | 65/390 |
| 5,877,890 A | 3/1999 | Snitzer | 359/341 |
| 5,898,715 A | 4/1999 | LeGrange et al. | 372/6 |
| 5,949,941 A | 9/1999 | DiGiovanni | 385/127 |
| 5,966,491 A | 10/1999 | DiGiovanni | 385/127 |
| 6,031,850 A | 2/2000 | Cheo | 372/6 |
| 6,081,366 A | 6/2000 | Kidorf et al. | 359/341 |
| 6,101,199 A | 8/2000 | Wang et al. | 372/6 |
| 6,115,526 A | 9/2000 | Morse | 385/125 |
| 6,154,595 A | 11/2000 | Yokogawa et al. | 385/127 |
| 6,157,763 A | 12/2000 | Grubb et al. | 385/126 |
| 6,192,713 B1 | 2/2001 | Zhang et al. | 65/390 |
| 6,263,003 B1 | 7/2001 | Huang et al. | 372/6 |
| 6,288,835 B1 | 9/2001 | Nilsson et al. | 359/341.3 |
| 6,304,705 B1 | 10/2001 | Kalish et al. | 385/128 |
| 6,317,537 B1 | 11/2001 | Ionov et al. | 385/32 |
| 6,345,141 B1 | 2/2002 | Grubb et al. | 385/127 |
| 6,411,762 B1 | 6/2002 | Anthon et al. | 385/123 |
| 6,445,494 B1 | 9/2002 | Nilsson et al. | 385/123 |
| 6,477,307 B1 | 11/2002 | Tankala et al. | 385/127 |
| 6,483,973 B1 | 11/2002 | Mazzarese et al. | 385/123 |
| 6,516,124 B2 | 2/2003 | Po | 385/126 |
| 6,625,363 B2 | 9/2003 | Carter et al. | 385/127 |
| 2002/0197039 A1 | 12/2002 | Carter et al. | 385/123 X |
| 2003/0156321 A1 | 8/2003 | Kent et al. | 385/123 X |
| 2003/0210877 A1 | 11/2003 | Berkey et al. | 385/123 X |
| 2004/0042759 A1 * | 3/2004 | Park et al. | 385/142 |

OTHER PUBLICATIONS

Nilsson et al.; "Ring–doped cladding–pumped single–mode three–level fiber laser"; Optics Letters, vol. 23, No. 5, pp. 355–357 (Mar. 1, 1998).

Offerhaus et al.; "High–energy single–transverse–mode Q–switched fiber laser . . . "; Optics Letters, vol. 23, No. 21, pp. 1683–1685 (Nov. 1, 1998).

Alvarez–Chavez et al.; "High–energy, high–power ytterbium–doped Q–switched fiber laser"; Optics Letters, vol. 25, No. 1, pp. 37–39 (Jan. 1, 2000).

Vienne et al.; "Fabrication and Characterization of $Yb^{3+}$:$Er^{3+}$ Phosphosilicate Fibers for Lasers"; Journal of Lightwave Technology, vol. 16, No. 11, pp. 1990–2001 (Nov. 1998).

* cited by examiner

FIBER FOR ENHANCED ENERGY ABSORPTION

CROSS-REFERENCE TO RELATED APPLICATIONS

This application is a continuation of International Application No. PCT/US02/06190, having an international filing date of Mar. 1, 2002, and which in turn claims priority to, and is a continuation-in-part of, U.S. Utility patent application Ser. No. 09/798,148 filed Mar. 2, 2001 and issued as U.S. Pat. No. 6,516,124 B2 on Feb. 4, 2003. The foregoing applications and patent are incorporated herein by reference.

TECHNICAL FIELD

The invention relates to fibers, such as fiber lasers and fiber amplifiers, and systems containing such fibers.

BACKGROUND

Fibers, such as fiber lasers and fiber amplifiers, can be used to enhance absorption of pump energy. One type of fiber, commonly referred to as a double clad fiber, includes a core containing an active material, a first cladding around the core, and a second cladding around the first cladding.

SUMMARY

The invention relates to fibers, such as fiber lasers and fiber amplifiers, and systems containing such fibers.

In one aspect, the invention generally features a fiber having a core, a first cladding around the core, and a second cladding around the first cladding. The outer perimeter of the first cladding has at least two substantially flat sides, and the outer perimeter of the second cladding is nonoval-shaped.

In another aspect, the invention generally features a fiber having a core, a first cladding around the core, and a second cladding around the first cladding. The core is formed of an active material. The first cladding has a lower index of refraction than the core. The outer perimeter of the first cladding has at least two substantially flat sides, and the outer perimeter of the second cladding is nonoval-shaped.

In a further aspect, the invention generally features a fiber having a core and a cladding around the core. The cladding has an outer perimeter including two substantially flat sides that are substantially nonperpendicular to each other. The lengths of the two substantially flat sides are different.

In yet a further aspect, the invention generally features a fiber having a core, a first cladding around the core, and a second cladding around the first cladding. The core is formed of an active material. The first cladding has a lower refractive index than the active material. The outer perimeter of the first cladding has two substantially flat sides that are substantially nonperpendicular to each other. The lengths of the two substantially flat sides are different.

In still a further aspect, the invention generally features a fiber having a core, a first cladding around the core, and a second cladding around the first cladding. The first cladding has an outer perimeter with at least two substantially flat sides. The core is substantially centrally disposed with respect to the geometric center of the outer perimeter of the second cladding, and the core is substantially eccentrically disposed with respect to the geometric center of the outer perimeter of the first cladding.

In another aspect, the invention features a fiber having a core, a first cladding around the core, and a second cladding around the first cladding. The core is formed of an active material, and the first cladding has a lower index of refraction than the core. The first cladding has an outer perimeter with at least two substantially flat sides. The core is substantially centrally disposed with respect to the geometric center the outer perimeter of the second cladding, and the core is substantially eccentrically disposed with respect to the geometric center outer perimeter of the first cladding.

In additional aspects, the invention generally features a system containing an energy source and one or more of the foregoing fibers. The energy source can be, for example, a laser. In certain embodiments, the energy source and fiber are arranged in an end pump configuration. In some embodiments, the energy source and fiber are arranged in a side pump configuration.

Embodiments of the above aspects of the invention can include one or more of the following features.

The core can be formed of an active material. The core can be formed of a rare earth ion doped material. The core can be formed of a silica material and at least one rare earth ion. The core can be a single mode core. The core can be a multi-mode core. The fiber can further include an additional material around which the core is disposed. The core can be ring-shaped.

The first cladding can be formed of a silica material.

The second cladding can be formed of a polymeric material.

The core can have a greater index of refraction than the first cladding. The first cladding can have a greater index of refraction than the second cladding.

The outer perimeter of the second cladding can be nonoval shaped (e.g., substantially circular).

The two substantially flat sides can be substantially parallel. The angle between the first and second substantially flat sides can be, for example, from about 2° to about 88°.

The two substantially flat sides can have the same lengths. The two substantially flat sides can have different lengths.

The core can be substantially centrally disposed with respect to the geometric center of the outer perimeter of the second cladding. The core can be substantially eccentrically disposed with respect to the geometric center of the outer perimeter of the first cladding. The core can be closer to a substantially flat side of the outer perimeter of the first cladding that is longer than at least one other (e.g., all other) substantially flat side(s) of the outer perimeter of the first cladding.

In one aspect, the invention features a fiber that includes an inner core, an outer core around the inner core, and a cladding around the outer core. The outer core includes an active material having an index of refraction, and the outer core has an index of refraction that is greater than the index of refraction of the cladding.

In another aspect, the invention features a fiber that includes an inner core including a photosensitive material, an outer core around the inner core, and a cladding around the outer core. The index of refraction of the outer core is greater than the index of refraction of the cladding.

In another aspect, the invention features a fiber including an inner core, an outer core around the inner core, and a cladding around the outer core. The outer core includes a photosensitive material having an index of refraction, and the index of refraction of the outer core is greater than the index of refraction of the cladding.

Embodiments can include one or more of the following aspects.

The inner core can be a photosensitive material. The inner core can include a silica material and at least one of the following materials: germanium, aluminum, phosphorus, boron, fluorine and/or tin. The inner core can be a non-active material.

The outer core can be a rare earth ion doped material. The outer core can include a silica material and at least one rare earth ion. The outer core can include a silica material and at least one of the following materials: erbium, ytterbium, neodymium, holmium, dysprosium and/or thulium.

The inner and outer core can be a single mode core.

The inner core can be substantially symmetrical or asymmetrical in shape. The outer core can be substantially symmetrical or asymmetrical in shape. The cladding can be substantially symmetrical or asymmetrical in shape.

The index of refraction of the outer core can be less than the index of refraction of the inner core.

The cladding can include a silica material.

The outer perimeter of the cladding can be substantially circular or non-circular.

The inner core can be substantially centrally disposed with respect to a geometric center of the outer perimeter of the outer core, or the inner core can be substantially eccentrically disposed with respect to a geometric center of the outer perimeter of the outer core.

The outer core can be substantially centrally disposed with respect to a geometric center of the outer perimeter of the cladding, or the outer core can be substantially eccentrically disposed with respect to a geometric center of the outer perimeter of the cladding.

The fiber can further include a material between the inner core and the outer core. The material between the inner core and the outer core can include a silica material. The material between the inner core and the outer core can have an index of refraction that is less than the index of refraction of the inner core. The material between the inner core can have an index of refraction that is less than the index of refraction of the outer core.

In additional aspects, the invention generally features a system containing an energy source and one or more of the foregoing fibers. The energy source can be, for example, a laser. In certain embodiments, the energy source and fiber are arranged in an end pump configuration. In some embodiments, the energy source and fiber are arranged in a side pump configuration.

The fibers can be, for example, in the form of a fiber laser or a fiber amplifier. Generally, a fiber laser has a lasing cavity (e.g., a resonator) that is used to provide gain for energy at a desired wavelength. Typically, the gain in the cavity for energy at the wavelength of interest exceeds the loss from the cavity for energy at the wavelength of interest. Generally, a fiber amplifier provides gain for energy at a wavelength of interest without the use of a lasing cavity (e.g., without a resonator).

In some embodiments, an inner core can be photosensitive and an outer core can be active.

In certain embodiments, an inner core can be active and an outer core can be active.

Features, objects and advantages of the invention are in the description, drawings and claims.

DETAILED DESCRIPTION

Figure 1:
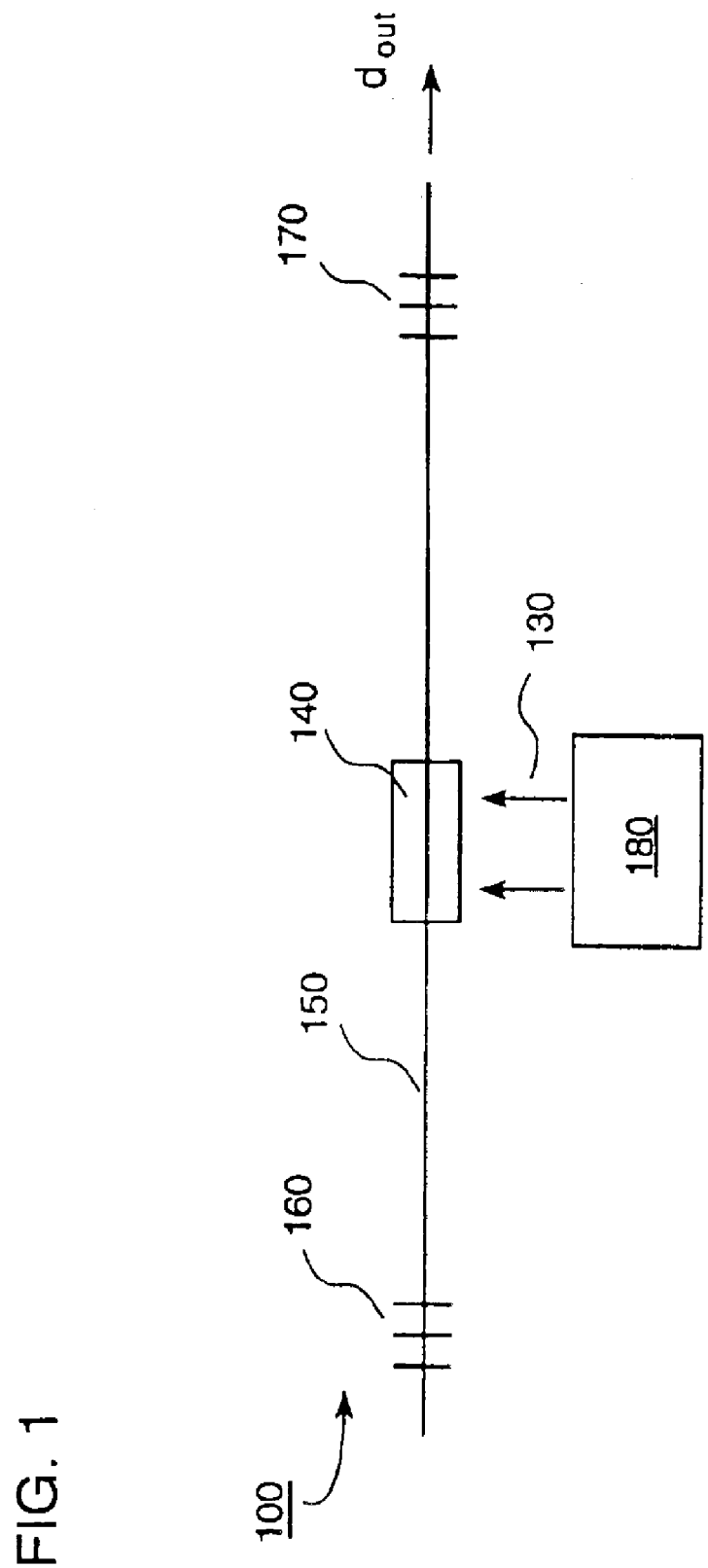
FIG. 1 is a schematic view of an embodiment of a fiber system.

FIG. 1 is a schematic view of an embodiment of a fiber laser system 100 in which a fiber 150 is used as a gain medium. An energy source 180 emits a pump signal 130 that is coupled to fiber 150 via a coupler 140 (see discussion below). A pair of gratings 160 and 170 reflect energy at a desired wavelength ($\Sigma_{out}$) within fiber 150. Fiber 150 contains an active material that interacts with the pump signal so that gratings 160 and 170 provide a lasing cavity for energy at $\Sigma_{out}$, and fiber 150 acts as a gain medium for energy at $\Sigma_{out}$. The reflectance of grating 170 is less than 100% so that a portion of energy at $\Sigma_{out}$ in fiber 150 passes through grating 170. While FIG. 1 shows one embodiment of fiber 150 in a fiber laser system, other fiber laser systems in which fiber 150 can be used will be apparent to those of skill in the art.

Figure 2:
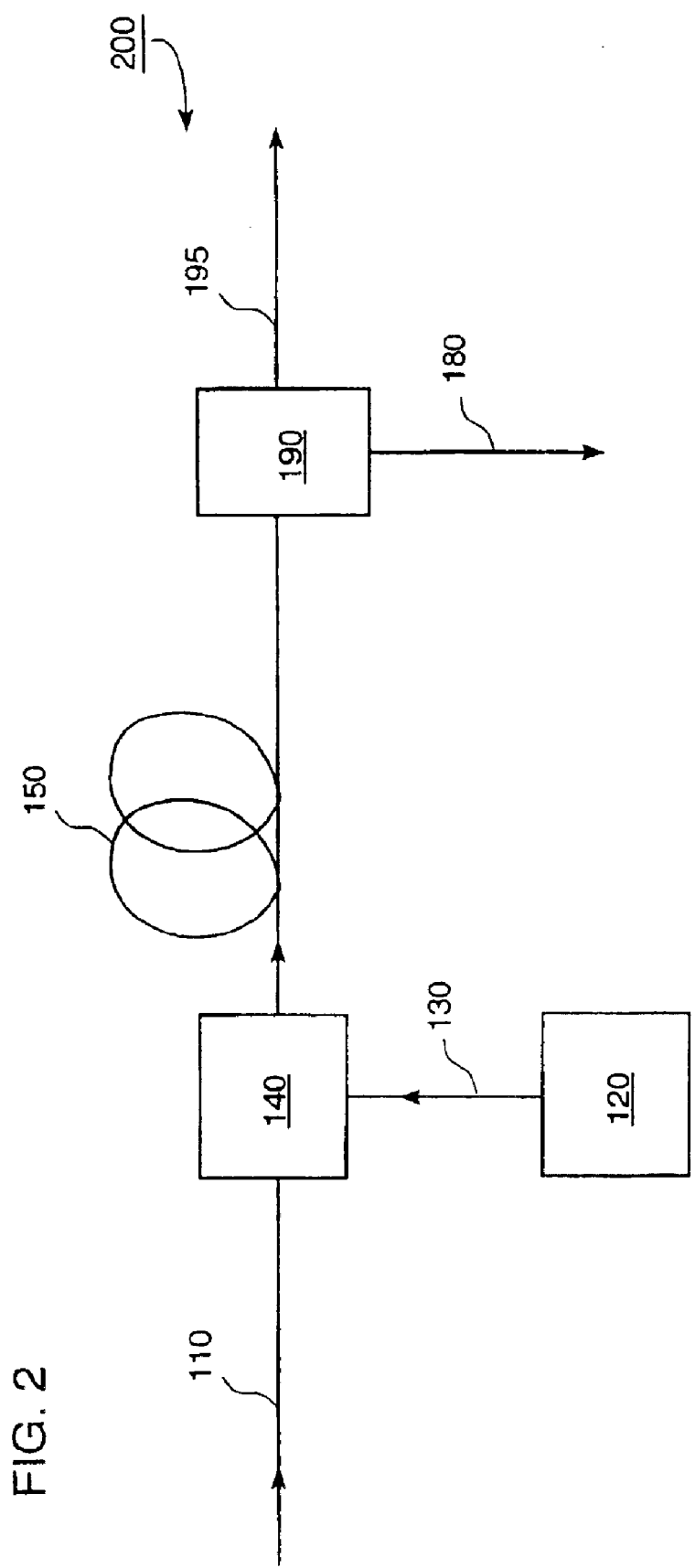
FIG. 2 is a schematic view of an embodiment of a fiber system.

FIG. 2 is a schematic view of an embodiment of a fiber amplifier system 200 in which fiber 150 is used as a signal amplifier. An input signal enters system 200 via fiber 110. Energy source 120 emits a pump signal 130. The input signal in fiber 110 and pump signal 130 are coupled into fiber 150 via coupler 140 (see discussion below). Pump signal 130 interacts with the active material in fiber 150, and the input signal is amplified. A device 190 (e.g., an isolator) separates the amplified input signal from the pump signal so that the pump signal travels along fiber 180, and the amplified input signal travels along fiber 195. While FIG. 2 shows one embodiment of fiber 150 in a fiber amplifier system, other fiber amplifier systems in which fiber 150 can be used will be apparent to those of skill in the art.

Figure 3:
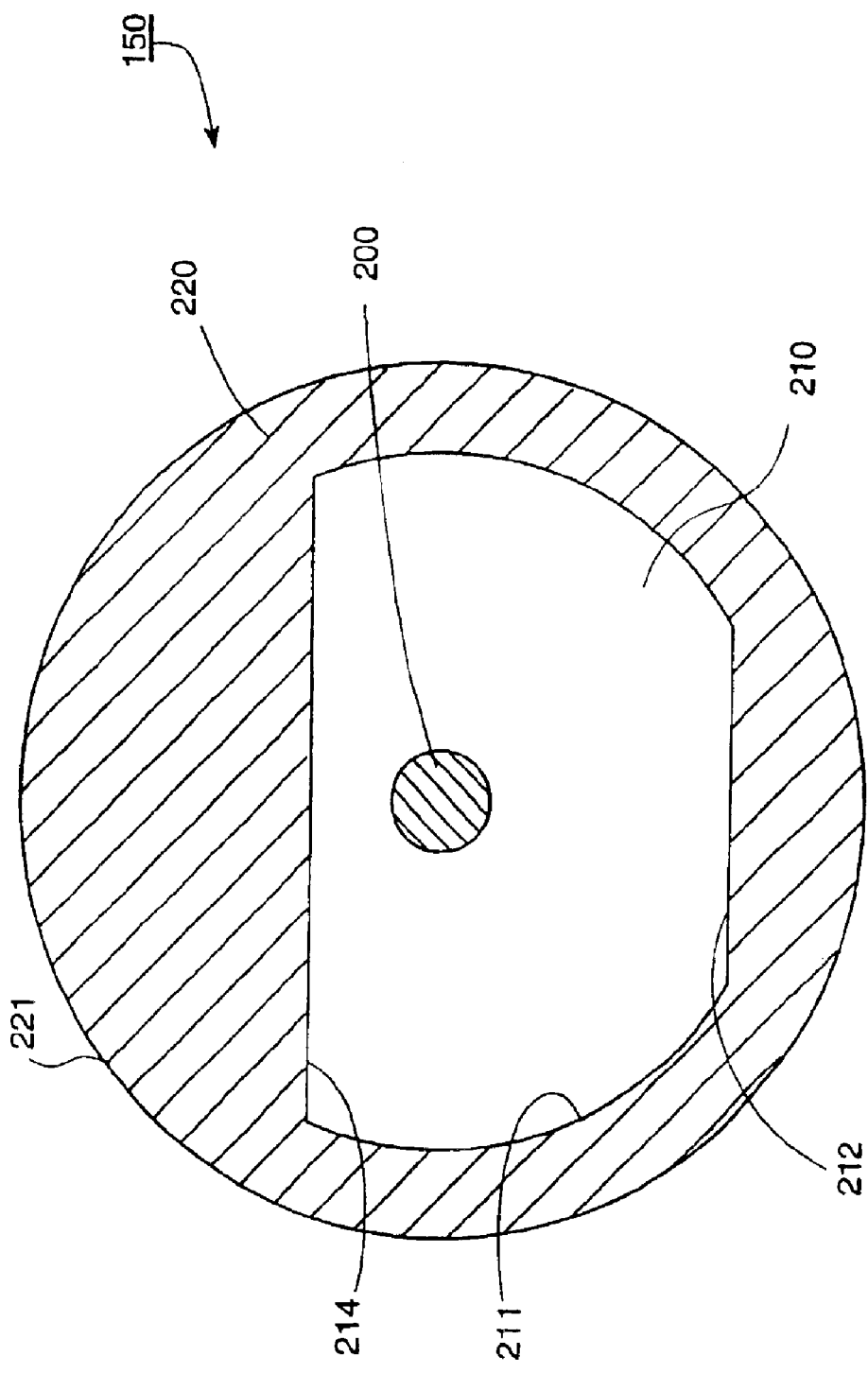
FIG. 3 is a cross-sectional view of an embodiment of a fiber.

FIG. 3 is a cross-sectional view of an embodiment of fiber 150 having a core 200 (e.g., a single mode core), a first cladding 210 and a second cladding 220.

Typically, core 200 includes a first material (e.g., a silica material, such as a fused silica) and at least one dopant (e.g., at least one rare earth ion, such as erbium ions, ytterbium ions, neodymium ions, holmium ions, dysprosium ions and/or thulium ions). More generally, however, core 200 can be formed of any material or combination of materials capable of interacting with the pump signal to enhance pump signal absorption (e.g., produce gain). In certain embodiments, core 200 is formed of fused silica doped with erbium ions.

Core 200 can optionally include certain other materials. For example, core 200 can include one or more materials to increase the index of refraction. Such materials include, for example, germanium oxide. Core 200 can include one or more materials to decrease the index of refraction. Such materials include, for example, boron oxide. Core 200 can include one or more materials (e.g., aluminum oxide) that enhance the solubility of the rare earth ion(s) within core 200 (e.g., within silica, such as fused silica). Core 200 can include one or more materials that enhance the homogeneity of the index of refraction within core 200. An example of such a material is phosphorus pentoxide.

Cladding 210 is usually formed of a material having a lower refractive index than core 200. In some embodiments, core 200 has a refractive index ($n_{200}$) and cladding 210 has a refractive index ($n_{210}$) so that (($n_{200})^2+(n_{210})$) is less than about 0.2 (e.g., less than about 0.17) and greater than about 0.05 (e.g., greater than about 0.12), such as from about 0.12 to about 0.17. Examples of materials from which cladding 210 can be formed include silica materials, such as fused silica materials.

Cladding 210 has an outer perimeter 211 that is substantially circular except for two substantially flat sides 212 and 214. Although FIG. 3 shows that the portions of perimeter 211 other than sides 212 and 214 are substantially circular, other designs can be used. Generally, the portions of perimeter 211 other than sides 212 and 214 are substantially non-flat (e.g., substantially non-flat, oval shaped or substantially non-flat, nonoval-shaped).

In the embodiment shown in FIG. 3, sides 212 and 214 are substantially parallel. More generally, however, sides 212 and 214 are substantially nonperpendicular. In some embodiments, sides 212 and 214 are arranged so that the acute angle between sides 212 and 214 is greater than about 2° (e.g., greater than about 5°, greater than about 10°, greater than about 15°, greater than about 20°, greater than about 25°, greater than about 30°, greater than about 35°, greater than about 40°, greater than about 45°, greater than about 50°, greater than about 55°, greater than about 60°, greater than about 65°, greater than about 70°, greater than about 75°, greater than about 80°, greater than about 85°). In certain embodiments, sides 212 and 214 are arranged so that the acute angle between sides 212 and 214 is less than about 88° (e.g., less than about 85°, less than about 80°, less than about 75°, less than about 70°, less than about 65°, less than about 60°, less than about 55°, less than about 50°, less than about 45°, less than about 40°, less than about 35°, less than about 30°, less than about 25°, less than about 20°, less than about 15°, less than about 10°, less than about 5°).

The lengths of sides 212 and 214 can be the same or different. In certain embodiments, the ratio of the length of side 212 to the length of side 214 is at least about 0.01 (e.g., at least about 0.02, at least about 0.03, at least about 0.04, at least about 0.05, at least about 0.06, at least about 0.07, at least about 0.08, at least about 0.09, at least about 0.1, at least about 0.2, at least about 0.3, at least about 0.4, at least about 0.5, at least about 0.6, at least about 0.7, at least about 0.8, at least about 0.9, at least about 0.95, or at least about 0.97). In some embodiments, the ratio of length of side 212 to the length of side 214 is at most about 0.98 (e.g., at most about 0.97, at most about 0.96, at most about 0.95, at most about 0.94, at most about 0.93, at most about 0.92, at most about 0.91, at most about 0.9, at most about 0.8, at most about 0.7, at most about 0.6, at most about 0.5, at most about 0.4, at most about 0.3, at most about 0.2, at most about 0.1, at most about 0.05 or at most about 0.03).

Cladding 220 is usually formed of a material having a lower refractive index than cladding 210. In some embodiments, claddings 210 and 220 have refractive indices ($n_{210}$) and ($n_{220}$), respectively, so that (($n_{210})^2+(n_{220})^2))^{1/2}$ is less than about 0.6 than about 0.5) and greater than about 0.3 (e.g., greater than about 0.4), such as from about 0.42 to about 0.47. Examples of materials from which cladding 220 can be formed include polymeric materials, such as, for example, acrylate resins, silicone polymers, polyurethane. Such materials can be, for example, fluorinated or nonfluorinated.

As shown in FIG. 3, an outer perimeter 221 of cladding 220 is substantially circular. More generally, other shapes can be used. For example, outer perimeter 221 can be substantially oval, substantially square, substantially rectangular or substantially triangular. Combinations of these shapes can also be used.

Core 200 is substantially eccentrically disposed with respect to the geometric center of outer perimeter 211 of cladding 210 (i.e., core 200 is not disposed in the geometric center of outer perimeter 211 of cladding 210), and core 200 is substantially centrally disposed with respect to the geometric center of outer perimeter 221 of cladding 220. The distance between the center of core 200 and flat side 214 (the longer flat side) is shorter than the distance between the center of core 200 and flat side 212 (the shorter flat side).

With this arrangement, as fiber 150 is bent, substantially flat side 214 tends to be located toward the outer curvature of the bend, and substantially flat side 212 tends to be located toward the inner curvature of the bend. This can be advantageous, for example, when it is desirable to ascertain the location of substantially flat sides 212 and/or 214 relative to the outer curvature and/or inner curvature of fiber 150. This can also be advantageous, for example, when it is desirable to have core 200 disposed in the same position relative to sides 212 and/or 214 along the length of fiber 150 when fiber 150 is bent.

Without wishing to be bound by theory, it is believed that this arrangement can result in enhanced pump energy absorption relative to an arrangement in which the core is substantially centrally disposed within the outer perimeter of the first cladding. As fiber 150 is bent, it is believed that modes of the pump energy in cladding 210 tend to aggregate toward substantially flat side 214 because side 214 is located toward the outer curvature of the bend. It is believed that, because core 200 is located relatively close to substantially flat side 214, the probability that a given mode of pump energy will interact with core 200 is increased relative to certain other arrangements (e.g., an arrangement in which the core is substantially centrally disposed relative to the outer perimeter of the first cladding), thereby allowing for enhanced pump energy absorption.

It is further believed that pump energy absorption is also enhanced because, when fiber 150 is bent and mode aggregation occurs as discussed above, the effective area of cladding 210 (e.g., the area of cladding 210 carrying the majority of modes of the pump energy) relative to the area of core 200 is increased relative to certain other arrangements (e.g., an arrangement in which the core is substantially centrally disposed relative to the outer perimeter of the first cladding). It is believed that this result is achieved because bending fiber 150 effectively reduces the area of cladding 210 carrying modes of pump energy, thereby increasing the effective ratio of the area of core 200 to cladding 210 in the area in which modes of the pump energy aggregate upon bending.

Other arrangements of the components of fiber 150 are also contemplated. For example, the distance between the center of core 200 and flat side 214 (the longer flat side) can be longer than the distance between the center of core 200 and flat side 212 (the shorter flat side). Alternatively, core 200 can be substantially centrally disposed with respect to the geometric center of outer perimeter 211 of cladding 210.

Fiber 150 can be manufactured using standard techniques. In certain embodiments, fiber 150 can be manufactured using modified chemical vapor deposition. Typically, in this process core 200 is formed inside cladding 210. A preform is prepared having a suitable ratio of the core diameter to the first cladding diameter. One or more substantially flat sides can then be ground on the preform (e.g., corresponding to substantially flat sides 212 and/or 214). Additional glass and fire processes are conducted to prepare the final preform. The fiber is then drawn from the final preform.

Figure 4:
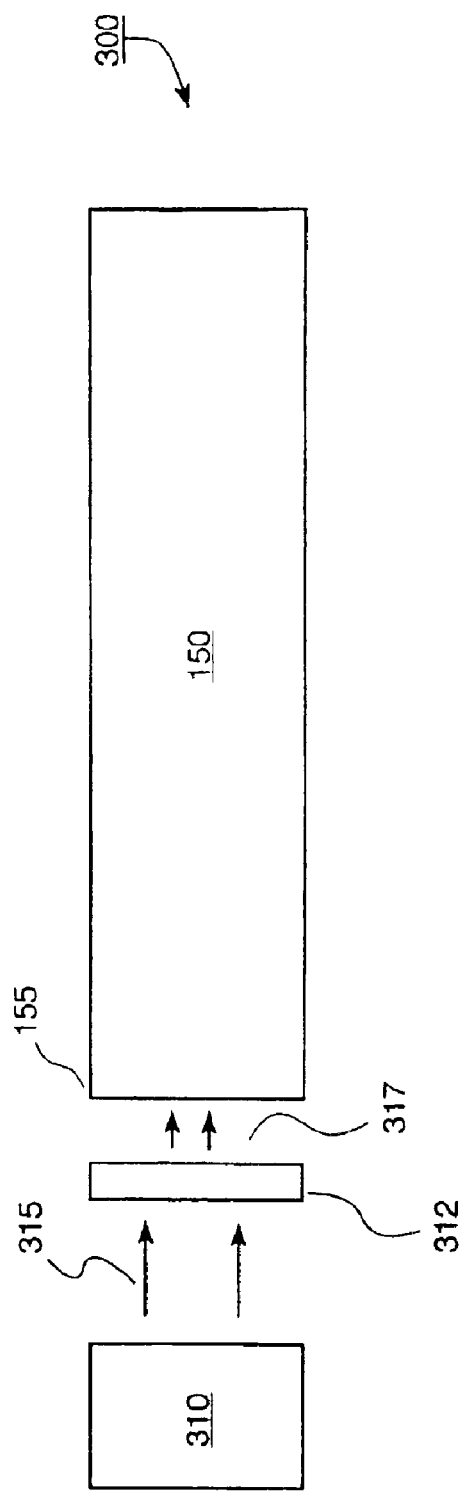
FIG. 4 is a schematic view of an embodiment of a fiber system.

FIG. 4 shows an embodiment of a system 300 containing an energy source 310 coupled to fiber 150 in an end pump configuration. Energy 315 emanating from source 310 irradiates a lens 312 that directs a focused beam 317 of the energy at an end portion 155 of fiber 150. Energy source 310 can be, for example, a laser, such as a semiconductor diode laser. In certain embodiments, energy source 310 is a semiconductor diode laser that irradiates end portion 155 with energy at a wavelength of about 915 nanometers or about 980 nanometers. In these embodiments, core 200 can contain, for example, ytterbium ions.

Figure 5:
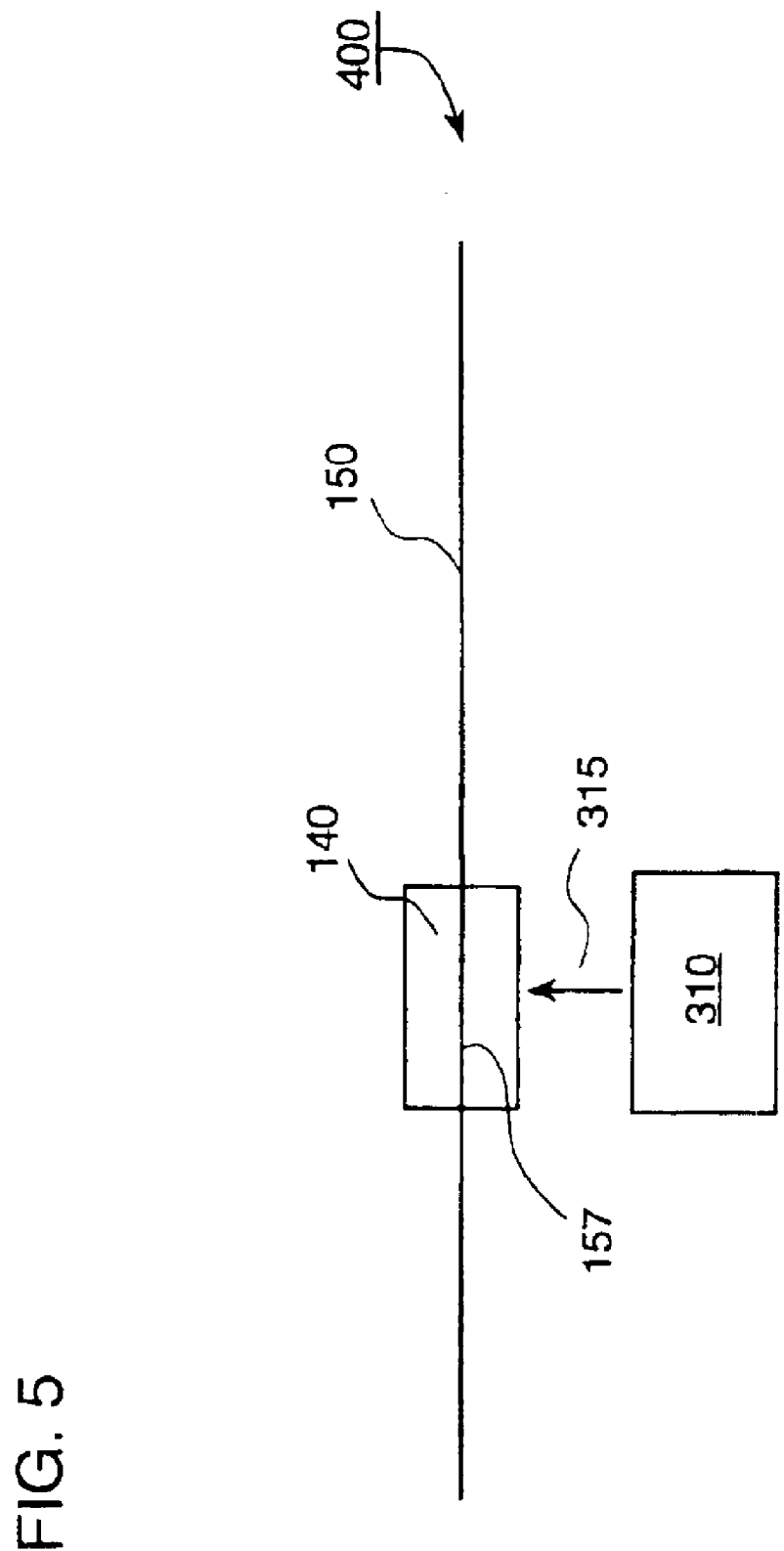
FIG. 5 is a schematic view of an embodiment of a fiber system.

FIG. 5 shows an embodiment of a system 400 containing energy source 310 and fiber 150 in a side pump configuration. Energy 315 emanating from source 310 irradiates a side portion 157 of fiber 150 and is coupled to core 200 and cladding 210 via coupler 140. Such couplers are known to those skilled in the art. For example, in certain embodiments, coupler 140 is a V-shaped groove (e.g., a 90° V-shaped groove) cut into claddings 210 and 220 on the side of fiber 150 opposite to portion 157. In some embodiments, coupler 140 is a removed portion of cladding 220 that is replaced with a prism having substantially the same refractive index as cladding 210. In other embodiments, coupler 140 is a removed portion of cladding 220 that is replaced with a coupling window.

Figure 6:
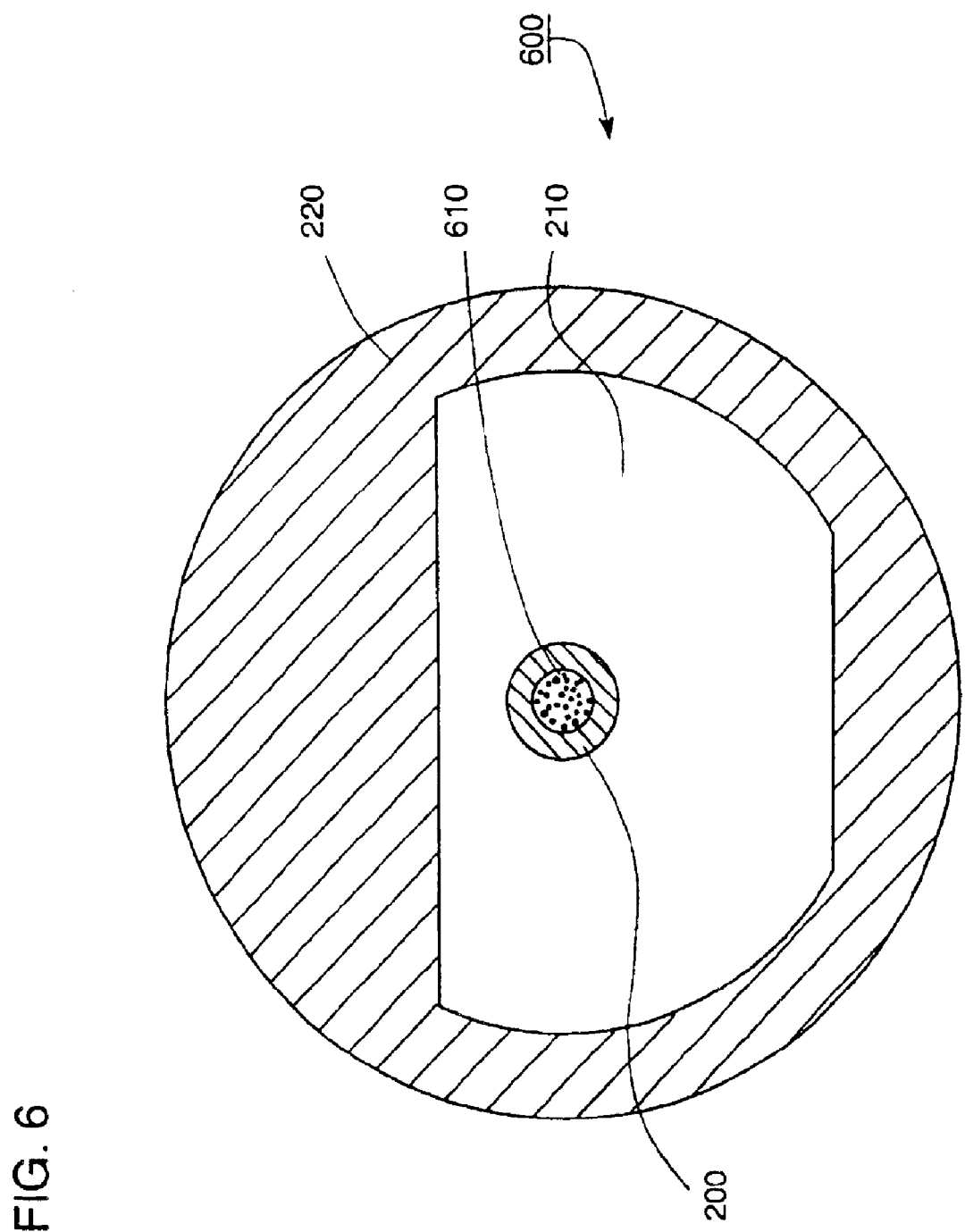
FIG. 6 is a cross-sectional view of an embodiment of a laser.

FIG. 6 is a cross-sectional view of an alternate embodiment of a fiber 600 that can be used in addition to or as a replacement for fiber 150 in systems 100, 200, 300 and/or 400. Fiber 600 has a core (e.g., a multimode core) formed of an inner material 610, a ring-shaped portion of core material (e.g., an active material) 200 around material 610, and claddings 210 and 220. Material 610 can have a refractive index ($n_{610}$) and core 200 can have a refractive index ($n_{200}$) so that $((n_{200})^2+(n_{610})^2)^{1/2}$ is less than about 0.2 (e.g. less than about 0.17) and greater than about 0.05 (e.g., greater than about 0.12), such as from about 0.12 to about 0.17. Examples of materials from which materials that can be used for material 610 include silica materials, such as fused silica materials. In certain embodiments, material 610 and cladding 210 are formed of the same material. In some embodiments, material 610 and cladding 210 are formed of different materials.

Figure 7:
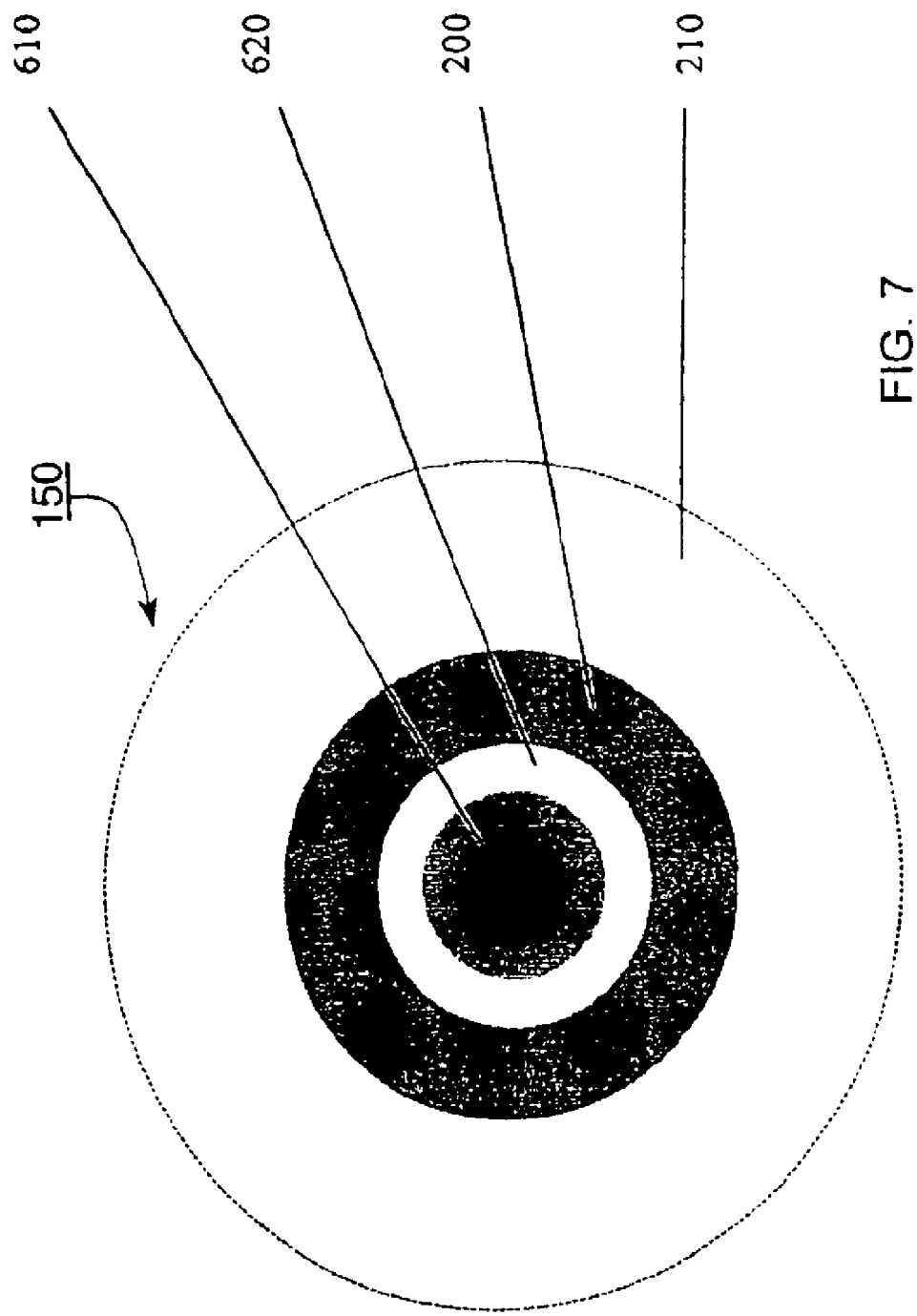
FIG. 7 is a cross-sectional view of an embodiment of a fiber.

FIG. 7 is a cross-sectional view of an embodiment of fiber 150 having an inner core 610, an outer core 200 around inner core 610, a buffer region 620 between inner core 610 and outer core 200 and a cladding 210. Typically, inner core 610 includes a first material (e.g., a silica material, such as a fused silica) and at least one material to increase the index of refraction. Such materials include, for example, germanium, aluminum, phosphorus, boron, fluorine, and/or tin. More generally, however, inner core 610 can be formed of any material or combination of materials capable of rendering fiber 150 sensitive to light (e.g., photosensitive). The photosensitivity effect leads to periodic changes in the refractive index along the fiber length, resulting in the formation of an intracore Bragg grating, when germanium-doped silica fibers are irradiated for a few minutes with one or more doses of intense laser light in the blue or UV spectral region.

In general, the diameter of inner core 610 can be varied as desired. For example, the diameter of inner core 610 can be at least about 5 microns (e.g., at least about 3 microns, at least about 5 microns) and/or at most about 10 microns (e.g., at most about 8 microns, at most about 10 microns). In certain embodiments, inner core 610 is about 5.6 microns in diameter and is doped with germanium oxide and boron to allow for grating writing.

Buffer region 620 is usually formed of a material having a lower refractive index than inner core 610 and outer core 200. In some embodiments, inner core 610 has a refractive index ($n_{610}$) and buffer region 620 has a refractive index ($n_{620}$) so that $((n_{610})^2-(n_{620})^2)^{1/2}$ is less than about 0.2 (e.g., less than about 0.17) and greater than about 0.05 (e.g., greater than about 0.12), such as from about 0.12 to about 0.17. In some embodiments, outer core 200 has a refractive index ($n_{200}$) and buffer region 620 has a refractive index ($n_{620}$) so that $((n_{200})^2-(n_{620})^2)^{1/2}$ is less than about 0.2 (e.g., less than about 0.17) and greater than about 0.05 (e.g., greater than about 0.12), such as from about 0.12 to about 0.17. Examples of materials from which buffer region 620 can be formed include silica materials, such as fused silica materials. In certain embodiments, buffer region 620 and cladding 210 are formed of the same material. In some embodiments, buffer region 620 and cladding 210 are formed of different materials.

Generally, the diameter of buffer region 620 can be varied as desired. For example, the diameter of buffer region 620 can be at least about 6 microns (e.g., at least about 3 microns, at least about 5 microns) and/or at most about 7 microns (e.g., at most about 7 microns, at most about 10 microns). In certain embodiments, buffer region 620 is about 7.2 microns in diameter.

Typically, outer core 200 includes a first material (e.g., a silica material, such as a fused silica) and at least one dopant (e.g., at least one rare earth ion, such as erbium ions, ytterbium ions, neodymium ions, holmium ions, dysprosium ions and/or thulium ions). More generally, however, outer core 200 can be formed of any material or combination of materials capable of interacting with the pump signal to enhance pump signal absorption (e.g., produce gain). In certain embodiments, outer core 200 is formed of fused silica doped with ytterbium ions.

Outer core 200 can optionally include certain other materials. For example, outer core 200 can include one or more materials to increase the index of refraction. Such materials include, for example, germanium oxide. Outer core 200 can include one or more materials to decrease the index of refraction. Such materials include, for example, boron oxide. Outer core 200 can include one or more materials (e.g., aluminum oxide) that enhance the solubility of the rare earth ion(s) within outer core 200. Outer core 200 can include one or more materials that enhance the homogeneity of the index of refraction within outer core 200 (e.g., phosphorus pentoxide).

In general, the diameter of core 200 can be varied as desired. For example, the diameter of core 200 can be at least about 10 microns (e.g., at least about 9 microns, at least about 11 microns) and/or at most about 12 microns (e.g., at most about 11 microns, at most about 14 microns). In certain embodiments, ring core 200 is about 12.2 microns in diameter.

Cladding 210 is usually formed of a material having a lower refractive index than outer core 200. In some embodiments, outer core 200 has a refractive index ($n_{200}$) and cladding 210 has a refractive index ($n_{210}$) so that $((n_{200})^2-(n_{210})^2)^{1/2}$ is less than about 0.2 (e.g., less than about 0.17) and greater than about 0.05 (e.g., greater than about 0.12), such as from about 0.12 to about 0.17. Examples of materials from which cladding 210 can be formed include silica materials, such as fused silica materials.

As shown in FIG. 7, the outer perimeter of cladding 210 is substantially circular. More generally, other shapes can be used. For example, the outer perimeter can be substantially oval, substantially square, substantially rectangular or substantially triangular. Combinations of these shapes can also be used.

As shown in FIG. 7, outer core 200 is substantially centrally disposed with respect to the geometric center of the outer perimeter of cladding 210. More generally, other arrangements of the components of fiber 150 may be used. For example, outer core 200 can be substantially eccentrically disposed with respect to the geometric center of the outer perimeter of cladding 210 (i.e., not disposed in the geometric center of the outer perimeter of cladding 210).

Fiber 150 can be manufactured using standard techniques. In certain embodiments, fiber 150 can be manufactured using modified chemical vapor deposition. Typically, in this process inner core 610 is formed inside cladding 210. A preform is prepared having a suitable ratio of the core diameter to the first cladding diameter. Additional glass and fire processes are conducted to prepare the final preform. The fiber is then drawn from the final preform.

Figure 8:
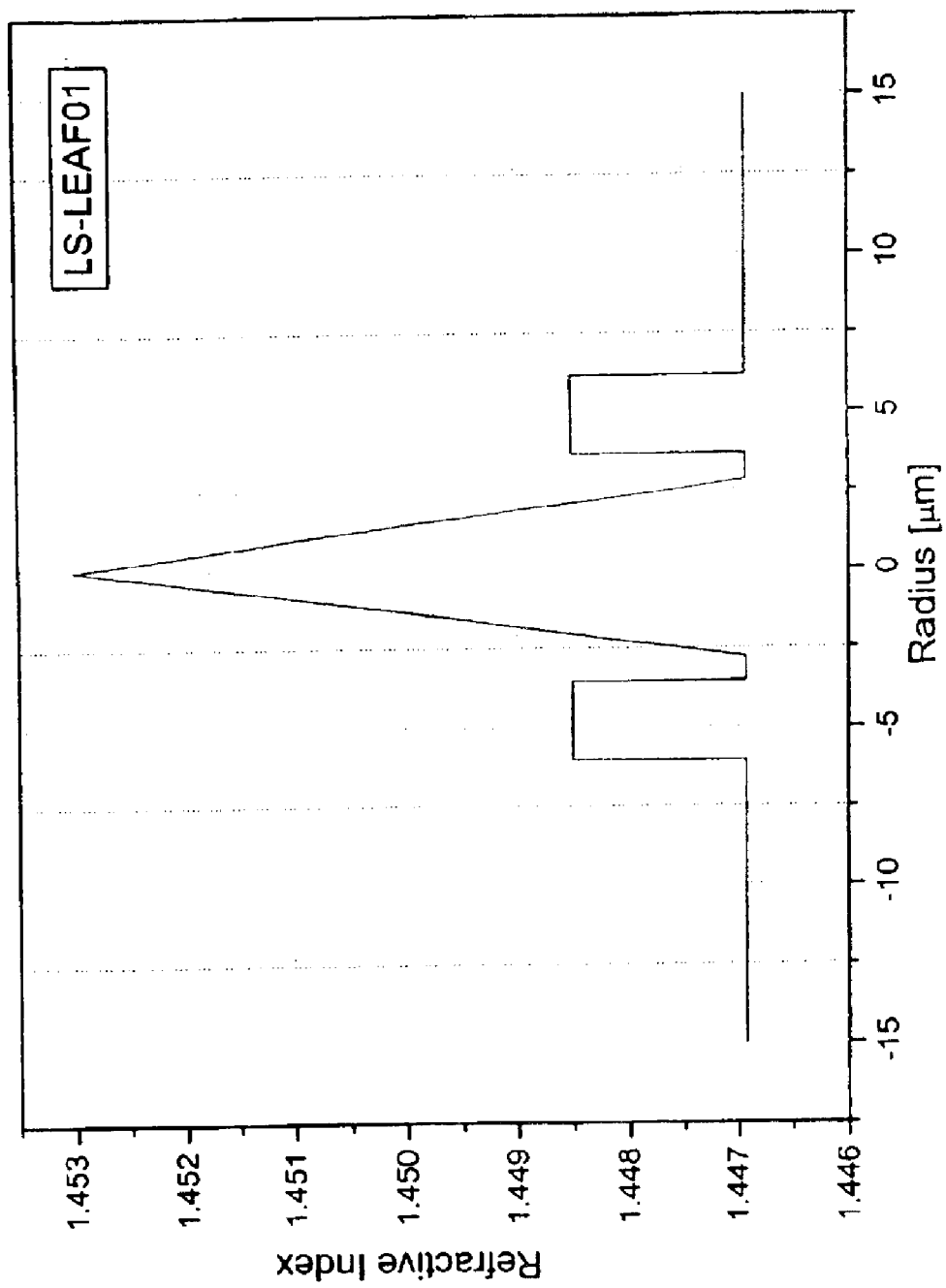
FIG. 8 is a refractive index profile of the fiber shown in FIG. 7.

FIG. 8 is a refractive index profile simulation (calculated using the equations described herein and using 1300 nm) of an embodiment of the optical fiber shown in FIG. 7 in which: core 610 is formed of $SiO_2$ doped with $GeO_2$ (approximately 5–15 mol %) and $B_2O_3$ (approximately 0–10 mol %) and has a diameter of 5.6 microns; region 620 is formed of $SiO_2$ doped with $GeO_2$ (approximately 0–1.0 mol %), $P_2O_5$ (approximately 0–1.0 mol %) and F (approximately 0–1.0 mol %), and has a diameter of 7.2 microns; core 200 is formed of $SiO_2$ doped with $Al_2O_3$ (approximately 0.5–1.5 mol %), $GeO_2$ (approximately 0–1.0 mol %), $P_2O_5$ (approximately 0–1.0 mol %), and $Yb_2O_3$ (approximately 0.05–0.5 mol %) and has a diameter of 12.2 microns; and cladding 210 is formed of $SiO_2$ and has a diameter of about 100 microns.

Although inner core 610 can be of any shape, it is highly doped with germanium to increase photosensitivity. Outer core 200 can similarly be of any shape; provided it attracts light out from the center for larger field distribution and to guide light at large radii, and improves bending performance by preventing light leaking out into cladding. Outer core 200 may be doped with rare-earth ions (e.g., $Yb^{3+}$) for fiber laser applications. The large mode field diameter suppresses fiber nonlinearities, such as SBS (stimulated Brillouin scattering), four-wave mixing, self phase modulation, etc., which are detrimental to the stability and performance of fiber lasers.

Given a cross-sectional geometrical and refractive index profile, there is a characteristic core radius that cuts off the next higher order mode at a certain wavelength. Geometrical parameters, including the refractive index, radius of the inner core, buffer region and outer core must therefore be manipulated to satisfy the requirement on cut-off wavelength for the second lowest mode.

Figure 9:
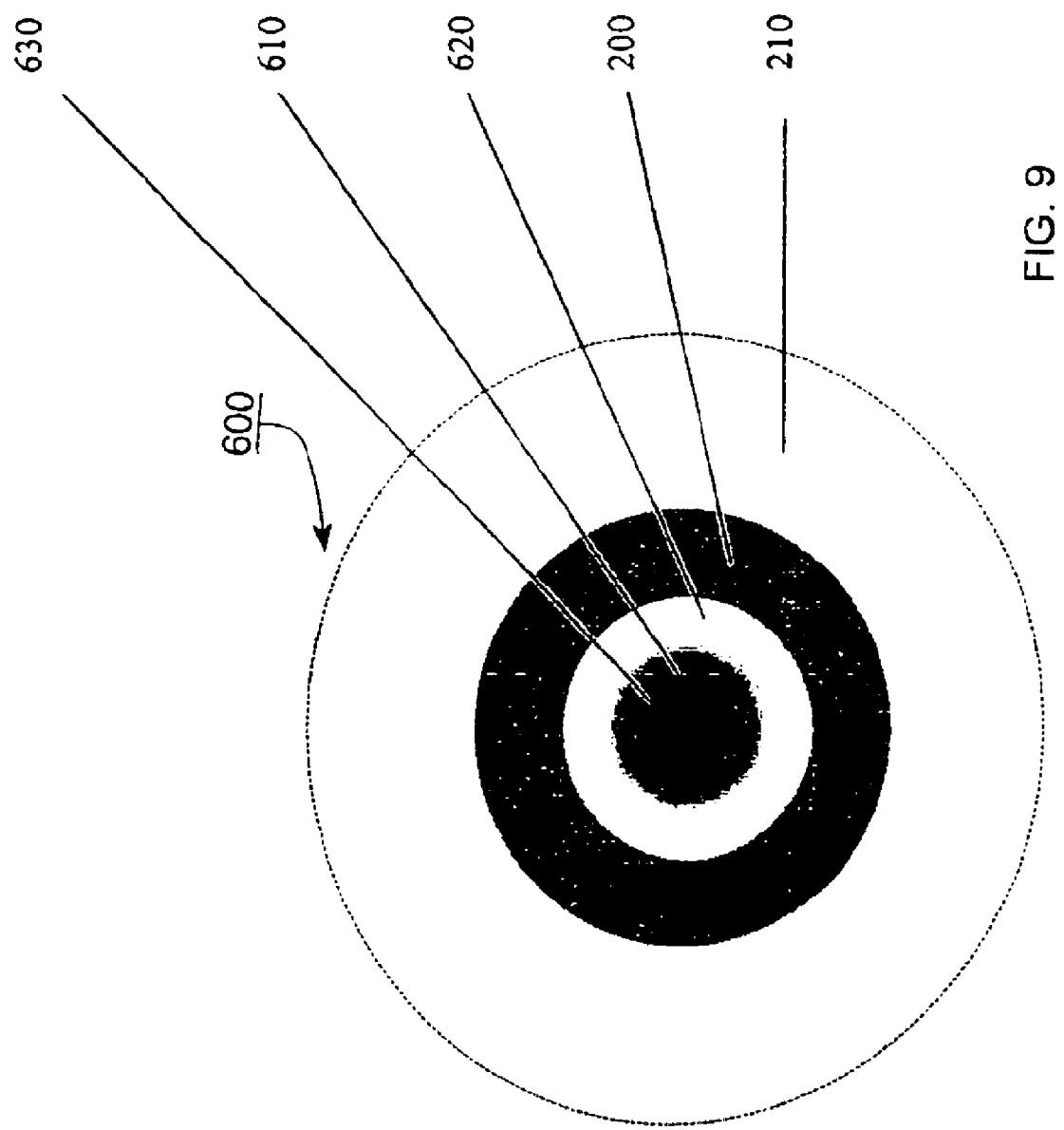
FIG. 9 is a cross-sectional view of another embodiment of a fiber.

FIG. 9 is a cross-sectional view of an alternate embodiment of a fiber 600 that can be used in addition to or as a replacement for fiber 150 in systems 100, 200, 300 and/or 400. Fiber 600 has a core formed of an inner core 610 around center core 630, an outer core 200 around inner core 610, a buffer region 620 between inner core 610 and outer core 200, and cladding 210.

The diameters of cores 610, 630 and 200, buffer region 620 and cladding 210 can be varied as desired.

In certain embodiments, center core 630 is about 1.6 microns in diameter, inner core 610 is about 6.4 microns in diameter, buffer region 620 is about 7.4 microns in diameter, and/or ring core 200 is about 12.4 microns in diameter.

The embodiment shown in FIG. 7 has a triangular center core while the embodiment shown in FIG. 9 has a trapezoidal center core. Experimental results indicated that if the index difference and core size are held constant, the rectangular core can exhibit stronger field confinement than other core shapes in single mode applications.

Figure 10:
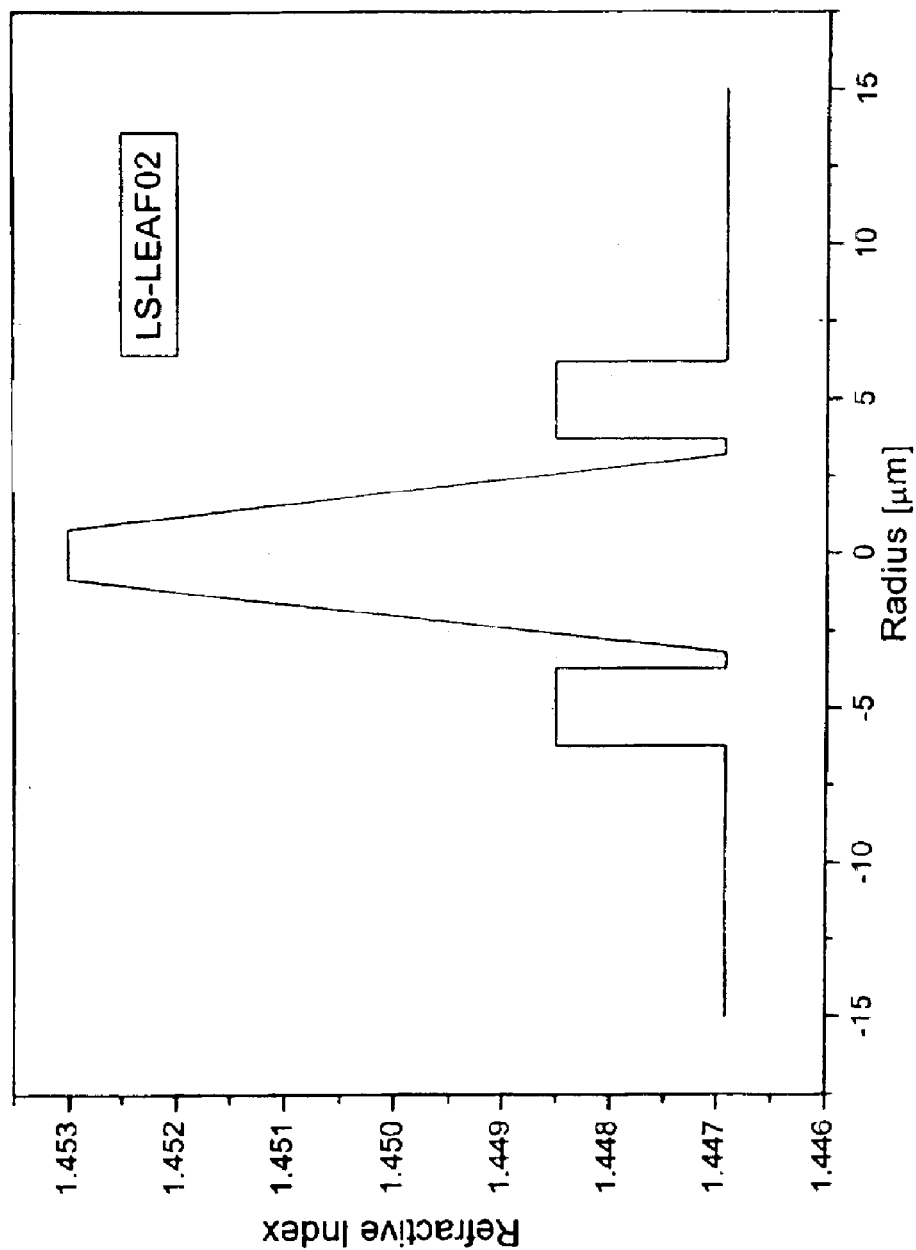
FIG. 10 is a simulated refractive index profile of the fiber shown in FIG. 9.

FIG. 10 is a refractive index profile simulation of an embodiment of the optical fiber shown in FIG. 9 (calculated using the equations described herein and using 1300 nm) in which core 630 is formed of $SiO_2$ doped with $GeO_2$ (approximately 5–15 mol %) and $B_2O_3$ (approximately 0–10 mol %) and has a diameter of 1.6 microns; core 610 is formed of $SiO_2$ doped with $GeO_2$ (approximately 5–15 mol %) and $B_2O_3$ (approximately 0–10 mol %) and has a diameter of 6.4 microns, region 620 is formed of $SiO_2$ doped with $GeO_2$ (approximately 0–1.0 mol %), $P_2O_5$ (approximately 0–1.0 mol %) and F (approximately 0–1.0 mol %), and has a diameter of 7.4 microns; core 200 is formed of $SiO_2$ doped with $Al_2O_3$ (approximately 0.5–1.5 mol %), $GeO_2$ (approximately 0–1.0 mol %), $P_2O_5$ (approximately 0–1.0 mol %), and $Yb_2O_3$ (approximately 0.05–0.5 mol %) and has a diameter of 12.4 microns; and cladding 210 is formed of $SiO_2$ and has a diameter of about 100 microns.

Figure 11:
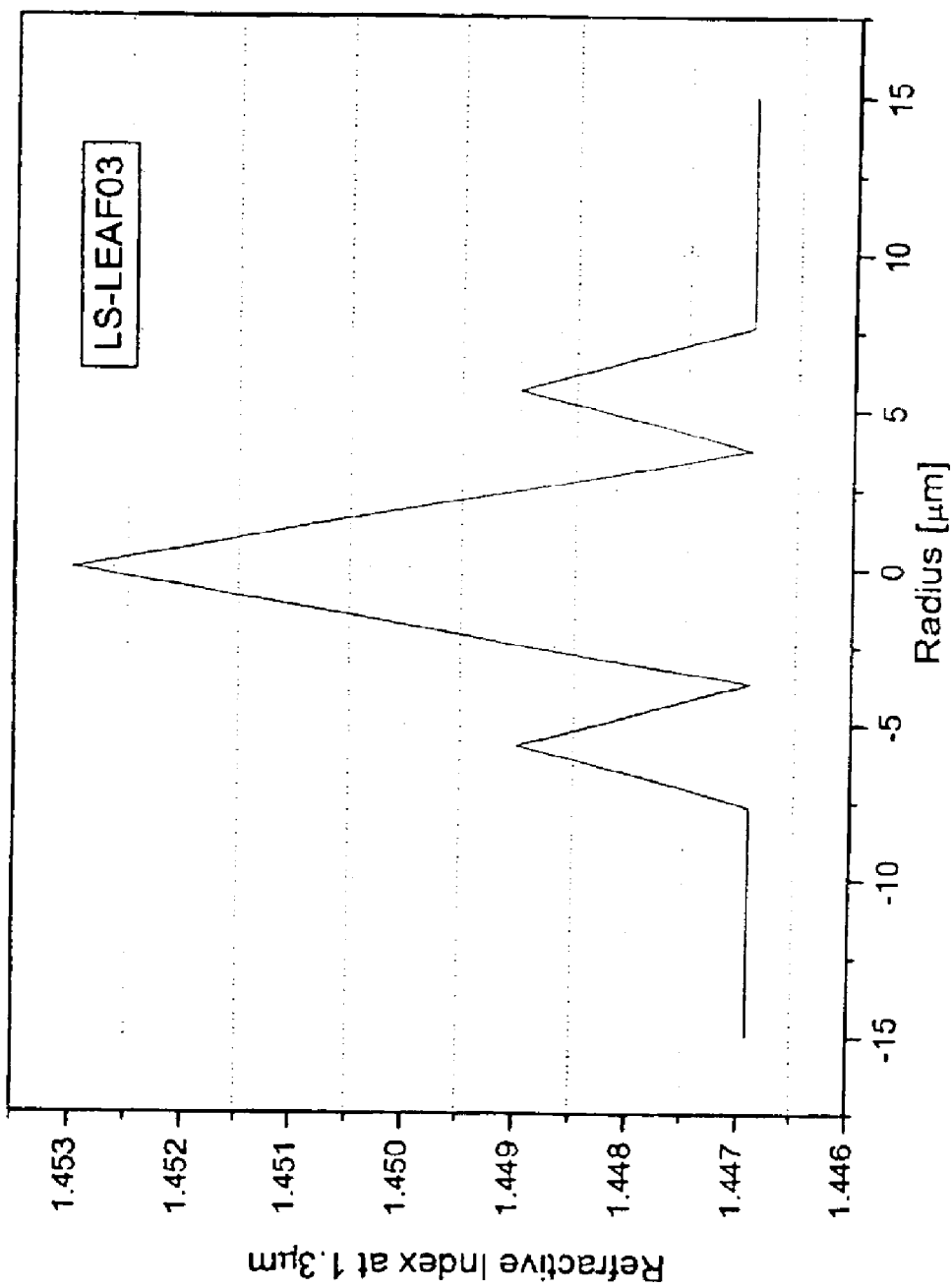
FIG. 11 is a simulated refractive index profile of another embodiment of a fiber.

FIG. 11 is a refractive index profile of another embodiment of fiber 150 in which core 610 is formed of $SiO_2$ doped with $GeO_2$ (approximately 5–15 mol %) and $B_2O_3$ (approximately 0–10 mol %) and has a diameter of 7 microns, region 620 has essentially zero thickness, core 200 is formed of $SiO_2$ doped with $Al_2O_3$ (approximately 0.5–1.5 mol %), $GeO_2$ (approximately 0–1.0 mol %), $P_2O_5$ (approximately 0–1.0 mol %), and $Yb_2O_3$ (approximately 0.05–0.5 mol %) and has a diameter of 15 microns; and cladding 210 is formed of $SiO_2$ and has a diameter of about 100 microns. For purposes of the present comparison, this index profile was modified to ensure the cutoff wavelength was less than one micron.

Figure 12:
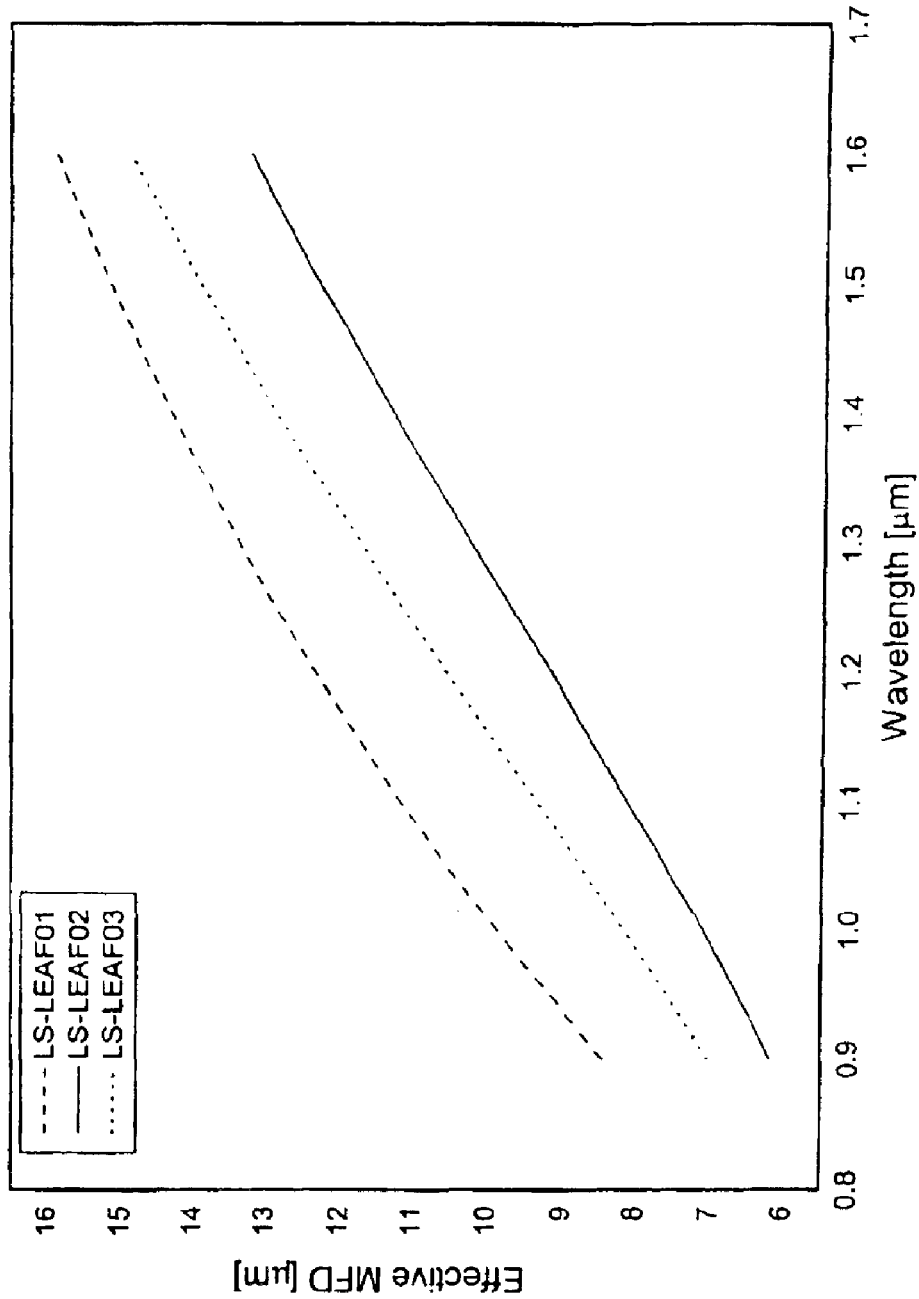
FIG. 12 is a graph showing mode field diameter simulation results for the fibers shown in FIGS. 7,9 and 11.

FIG. 12 is a graph showing mode field diameter simulation results for the fibers shown in FIGS. 7, 9 and 11. Mode field diameter (MFD) can be a significant parameter related to the optical field distribution in a fiber. It has been shown that MFD can provide useful information relating to cabling performance, such as macrobending, microbending and joint losses.

Effective Mode Area has a direct relation to the nonlinear distortions in long fiber links. Effective area is defined as $$A_{\mathit{eff}} = \frac{\left[\int_{-\infty}^{\infty}\int_{-\infty}^{\infty}|E(x,y)|^2\,dx\,dy\right]^2}{\int_{-\infty}^{\infty}\int_{-\infty}^{\infty}|E(x,y)|^4\,dx\,dy},$$

where $E(x, y)$ is field distribution.

Hence, the definition of Effective Mode Field Diameter follows:

$$d_{\mathit{eff}} = \frac{2}{\sqrt{\pi}}\sqrt{A_{\mathit{eff}}}.$$

Macrobending loss is a radiative loss when the fiber bend radius is large compared to the fiber diameter. The model in simulation uses the closed-form integral formula, published by J. Sakai and T. Kimura in 1978. It is appropriate for calculating the macrobending loss of any LP mode, both fundamental and higher-order, in arbitrary-index profile optical fibers. Using this formula the macrobending power loss coefficient is expressed as a function of the bending radius in the form:

$$\gamma = \frac{\sqrt{\pi}\,(P_{clad}/P)}{2sr_c[K_{\nu-1}(W)K_{\nu+1}(W) - K_\nu^2(W)]} \frac{\exp\left(\frac{-4\Delta W^3}{3r_c V^2}R_b\right)}{W\left(\frac{WR_b}{r_c} + \frac{V^2}{2\Delta W}\right)^{1/2}}$$

The parameters appearing above are given by:

$$V = k_0 r_c \sqrt{N_{\max}^2 - N_{\min}^2}$$

$$W = r_c \sqrt{\beta^2 - (k_0 N_{\min}^2)^2}$$

$$\Delta = \frac{N_{\max}^2 - N_{\min}^2}{2N_{\max}^2}:$$

Where $r_c$ denotes the fiber core radius, $N_{max}$ and $N_{min}$ are the maximum and minimum values of the refractive index, $\beta$ is the propagation constant of the mode, $k_0$ is the propagation constant in vacuum, $\nu$ is the azimuthal mode number, $s=2$ if $\nu=0$ or $s=1$ for $\nu\ne 0$ and $K_\nu$ is the modified Bessel function of the second kind of order $\nu$.

In single mode fiber, after cutoff wavelength is reached, the mode field expands in size with increasing wavelength in predictable manner. As the field expands, more light propagates in the cladding, which makes the fiber more sensitive to bending. Therefore, bending loss increases as the difference between operating wavelength and single-mode cutoff wavelength increases.

Microbending loss is associated with small perturbations of the fiber, induced by such factors as uneven coating application or cabling induced stresses. The result of the perturbations is to cause the coupling of propagating modes in the fiber by changing the optical path length. This destabilization of the modal distribution causes lower order modes to couple to radiative higher order modes.

Figure 13:
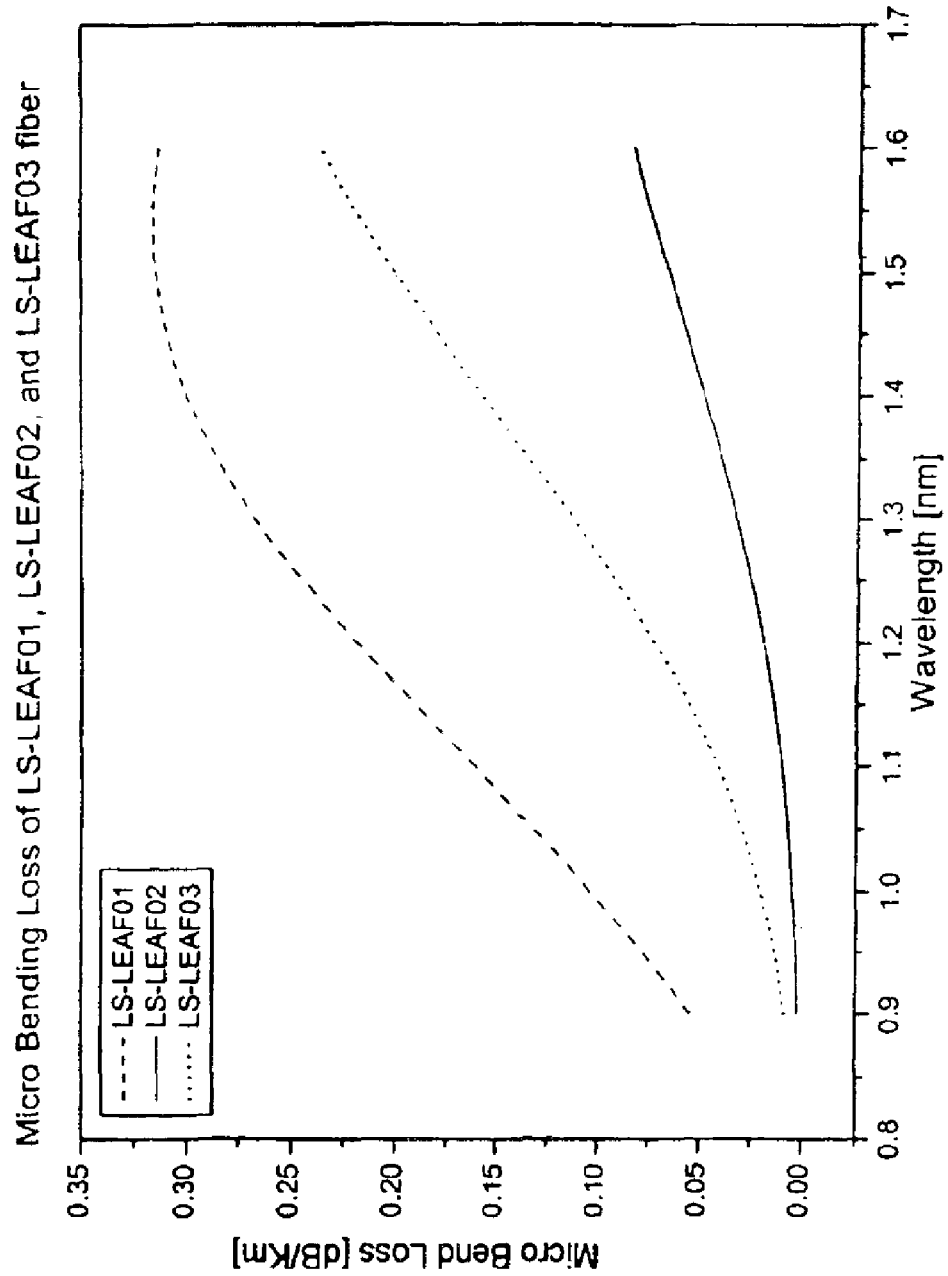
FIG. 13 is a graph showing macrobending loss simulation results for the fibers shown in FIGS. 7, 9 and 11.

FIG. 13 is a graph showing microbending loss simulation results for the fibers shown in FIGS. 7, 9 and 11. The results indicate that the fiber of FIG. 11 is most sensitive to microbending loss. However, the attenuation coefficient of this fiber is only about 0.2 dB/km at about 1.15 micron. Since the length of fiber used in a fiber laser is typically less than 60 m, the total microbending loss of this fiber is expected to be less than about 0.012 dB.

Figure 14:
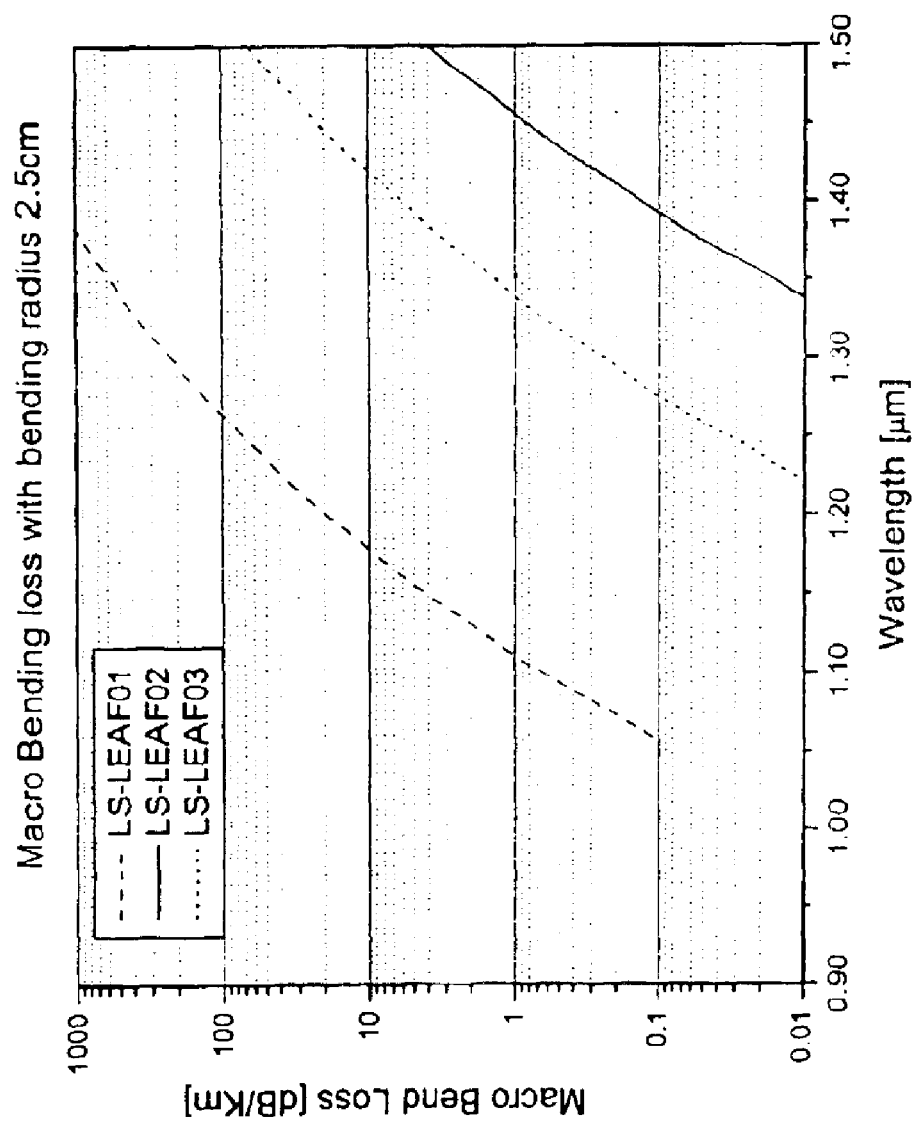
FIG. 14 is a graph showing microbending loss simulation results for the fibers shown in FIGS. 7, 9 and 11.

FIG. 14 shows the macrobending loss of the fibers shown in FIGS. 7, 9 and 11 when subjected to a bending radius of about 2.5 cm. As shown in FIG. 14, when the bending radius is greater than about 2.5 cm, the bending loss in each of these fibers is less than about 2 dB/km (e.g., about 0.12 dB in a 60 m long fiber) at operating wavelengths less than about 1.15 micron.

While certain embodiments of the invention have been disclosed herein, the invention is not limited to these embodiments. For example, a fiber can include additional layers of material. These layers of material can be, for example, adhesive layers, mechanical support layers, and/or protective layers (e.g., chemically protective layers and/or physically protective layers). Alternatively or additionally, a fiber can include a stiffening member (e.g., a metal rod) disposed along one side so that upon bending the stiffening member is preferentially oriented along the inner curvature of the bend of the fiber, thereby assisting in determining the location of the core within the fiber.

While FIGS. 7 and 9 have shown embodiments with a single cladding 210, it is to be understood that one or more additional claddings can be used in these embodiments. As an example, fiber 150 shown in FIG. 7 can include an additional cladding surrounding cladding 210. As another example, fiber 600 shown in FIG. 9 can include an additional cladding surround cladding 210.

The additional claddings can be formed, for example of a material having a lower refractive index than cladding 210. Examples of materials from which one or more of the additional claddings can be formed include polymeric materials, such as, for example, acrylate resins, silicone polymers, polyurethane. Such materials can be, for example, fluorinated or nonfluorinated.

Other embodiments are in the claims.

I claim:

1. An optical fiber, comprising:
   an inner core comprising an active material and an outer core around said inner core, said outer core comprising an index of refraction, said inner core and said outer core being single mode such that the second lowest mode is cutoff;
   a first cladding around said outer core, said first cladding comprising a first index of refraction that is less than said index of refraction comprised by said outer core; and
   a second cladding around said first cladding, said second cladding comprising a second index of refraction that is less than said first index of refraction comprised by said first cladding.

2. The optical fiber of claim 1 wherein said inner core comprises a photosensitive material.

3. The optical fiber of claim 1 wherein said outer core comprises a rare earth ion doped material.

4. The optical fiber of claim 1 wherein said inner core and said first cladding are formed of the same material.

5. An optical fiber, comprising:
   an inner core;
   an outer core around said inner core, said outer core comprising an active material and having an index of refraction, said active material for interacting with pump light for providing gain at a selected wavelength;
   a cladding around said outer core having an index of refraction, the index of refraction of said outer core being greater than the index of refraction of said cladding; and
   wherein said inner core does not comprise a material for providing optical loss for light having the selected wavelength so as to suppress unwanted modes.

6. The optical fiber of claim 5 wherein said active material comprises rare earth ions.

7. The optical fiber of claim 5 comprising a second cladding disposed about said inner cladding.

8. The optical fiber of claim 5 wherein said inner core comprises an index of refraction that is greater than the index of refraction of said outer core.

9. The optical fiber of claim 5 wherein said inner core has an index of refraction profile that varies as a function of the radius of said inner core.

10. The optical fiber of claim 9 wherein for a least a part of said index of refraction profile of said inner core, the index of refraction of said inner core decreases as radius increases.

11. An optical fiber, comprising:
an inner core and an outer core around said inner core;
a first cladding around said outer core, said first cladding for propagating pump energy for interaction with an active material that provides gain at a selected wavelength responsive to the interaction;
a second cladding around said first cladding;
said outer core comprising said active material, and
wherein said inner core does not comprise a material for providing optical loss for light having the selected wavelength so as to suppress unwanted modes.

12. The optical fiber of claim 11 wherein said inner core comprises a photosensitive material.

13. The optical fiber of claim 11 wherein said active material comprises rare earth ions.

14. The optical fiber of claim 11 wherein said inner core comprises an index of refraction that is greater than the index of refraction of said outer core.

15. The optical fiber of claim 11 wherein said inner core has an index of refraction profile that varies as a function of the radius of said inner core.

16. The optical fiber of claim 15 wherein for a least a part of said index of refraction profile of said inner core, the index of refraction of said inner core decreases as radius increases.

17. An optical fiber, comprising:
an inner core and an outer core around said inner core, said inner core comprising an index of refraction and said outer core comprising an index of refraction, said index of refraction of said inner core being greater than said index of refraction of said outer core;
a first cladding around said outer core, said first cladding for propagating pump energy for interaction with an active material;
a second cladding around said first cladding;
wherein said outer core attracts light from the center of said optical fiber for providing a larger field distribution of the fundamental mode of said optical fiber.

18. The optical fiber of claim 17 comprising said active material, and wherein said active material comprises rare earth ions.

19. The optical fiber of claim 17 wherein said inner core has an index of refraction profile that varies as a function of the radius of said inner core.

20. The optical fiber of claim 19 wherein for a least a part of said index of refraction profile of said inner core, the index of refraction of said inner core decreases as radius increases.

21. The optical fiber of claim 1 wherein said inner core comprises an index of refraction that is greater than the index of refraction of said outer core.

22. The optical fiber of claim 1 wherein said inner core has an index of refraction profile that varies as a function of the radius of said inner core.

23. The optical fiber of claim 22 wherein for a least a part of said index of refraction profile of said inner core, the index of refraction of said inner core decreases as radius increases.

* * * * *